United States Patent
Lake

(10) Patent No.: US 7,690,713 B2
(45) Date of Patent: Apr. 6, 2010

(54) 4-BAR HINGE SYSTEM FOR LOAD BED CAB-HIGH COVER ADAPTATION TO REAR LIFT ACCESS

(75) Inventor: William Henry Russell Lake, Lathrup Village, MI (US)

(73) Assignee: Trail-R Van Inc., Lathrup Village, MI (US)

( * ) Notice: Subject to any disclaimer, the term of this patent is extended or adjusted under 35 U.S.C. 154(b) by 38 days.

(21) Appl. No.: 12/069,750

(22) Filed: Feb. 12, 2008

(65) Prior Publication Data

US 2008/0203756 A1 Aug. 28, 2008

Related U.S. Application Data

(60) Provisional application No. 60/901,758, filed on Feb. 16, 2007.

(51) Int. Cl.
*B60P 7/02* (2006.01)
(52) U.S. Cl. .................................. 296/100.08; 296/165
(58) Field of Classification Search ............ 296/100.08, 296/165, 172, 175
See application file for complete search history.

(56) References Cited

U.S. PATENT DOCUMENTS

| | | | |
|---|---|---|---|
| 5,102,185 A | 4/1992 | Lake | |
| 5,104,175 A | 4/1992 | Enninga | |
| 5,595,418 A | 1/1997 | Medlin | |
| 5,971,446 A * | 10/1999 | Lunney, II | 296/100.08 |
| 6,447,045 B1 * | 9/2002 | Dickson et al. | 296/100.08 |
| 6,543,834 B2 | 4/2003 | Sisson | |
| 6,702,360 B1 * | 3/2004 | Santos et al. | 296/100.07 |
| 7,093,882 B2 | 8/2006 | Lake | |
| 2002/0089206 A1 | 7/2002 | VandenHeuvel | |
| 2004/0084928 A1 | 5/2004 | Bacon | |
| 2004/0088826 A1 | 5/2004 | Schlegel | |
| 2005/0264029 A1 | 12/2005 | Bodner | |
| 2006/0175863 A1 | 8/2006 | Evans | |

* cited by examiner

*Primary Examiner*—Dennis H Pedder

(57) ABSTRACT

4-bar hinge technology is applied to forward hinged mounting of a conventional cab high cover on a pickup truck load bed, so that the cover moves clear of the vehicle cab when raised to provide improved loading access. The hinge system may be integrated with upper and/or lower rails intermediately attached to the cover and load bed rails used as mounting interfaces in fixed cover installations. Use of these interfaces alone for system attachment supports universal application to conventional matched cab high covers and load beds with minimal component variation between applications. Resulting component dimensions accommodate compact packaging, and therefore convenient, efficient shipping and storage of adaptation hardware. The system concept accommodates use of readily available hardware suited to processes and equipment already in use within affected industries, and facilitates capture of dimensions for optimal function within hinge and intermediate rail assemblies, thereby minimizing reliance upon installer skills.

12 Claims, 7 Drawing Sheets

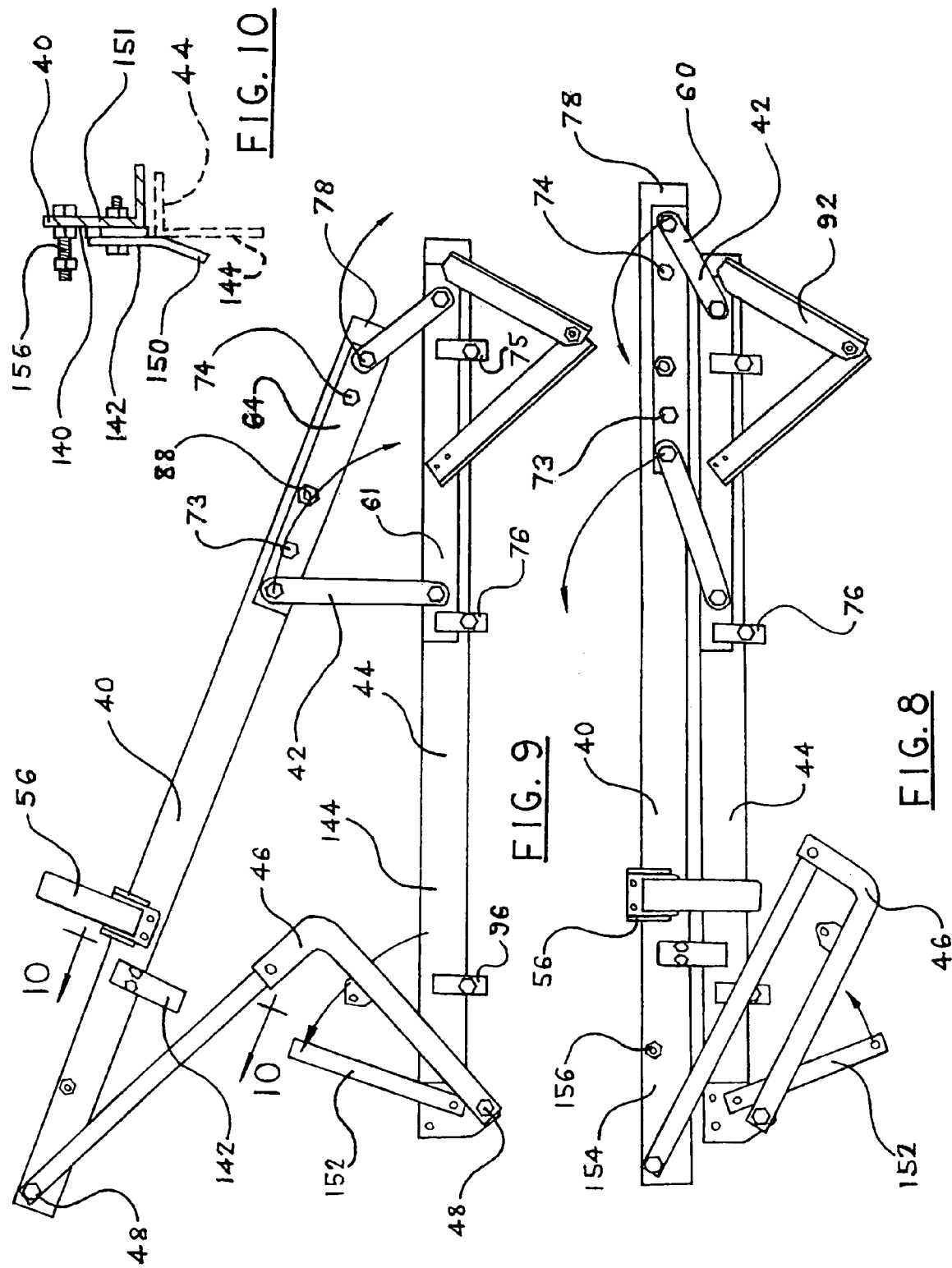

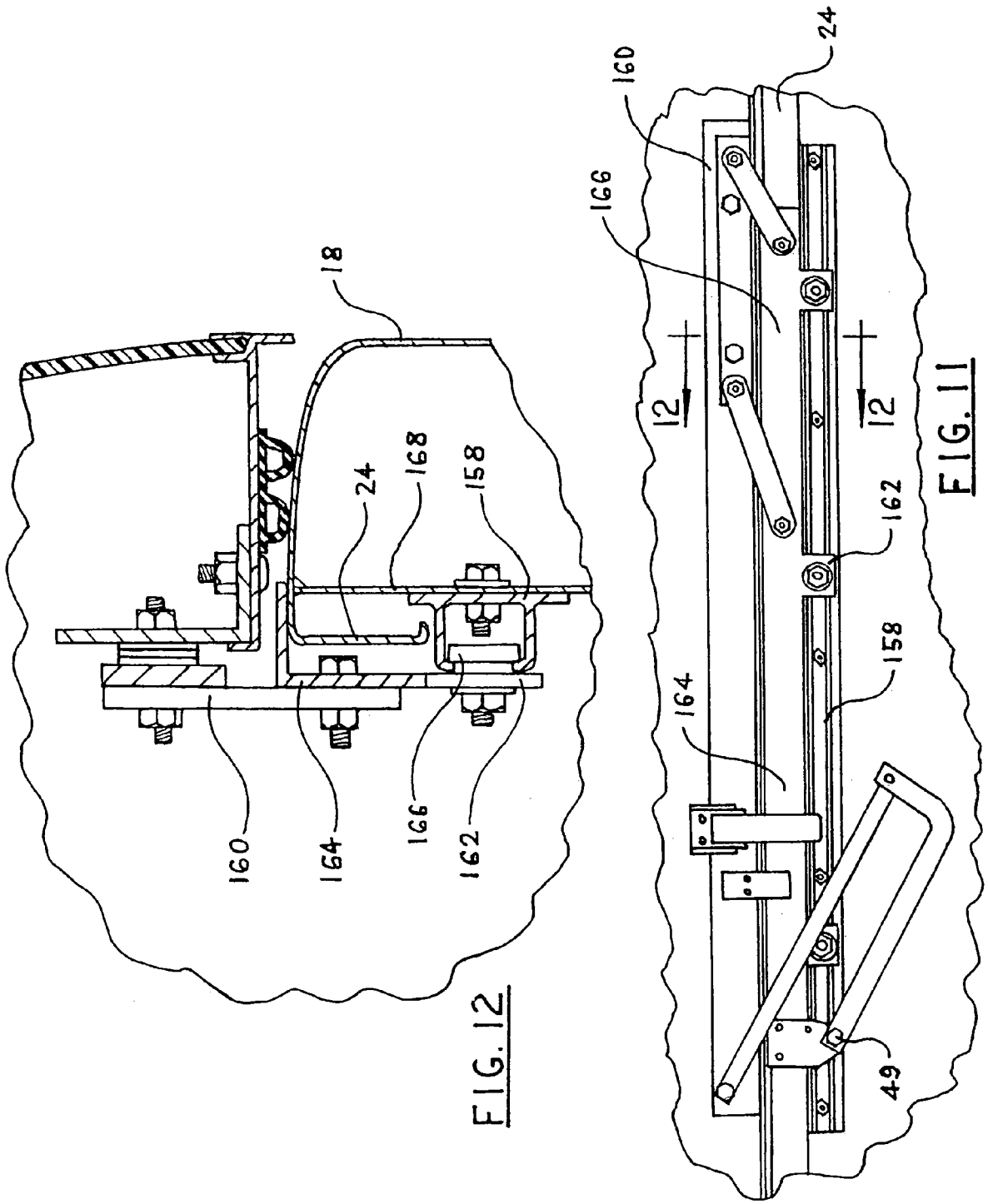

4-BAR HINGE SYSTEM FOR LOAD BED CAB-HIGH COVER ADAPTATION TO REAR LIFT ACCESS

CROSS-REFERENCES TO RELATED APPLICATIONS

This invention is based upon Provisional Application#113260 U.S. PTO 60/901,758 dated Feb. 16, 2007 entitled Short/Long Arm Hinging System for Cab-High Load bed Cover and claims benefit available to that application under 31 U.S.C. 119(e). The provisional application describes improvements over lift-roof cover concepts described under U.S. Pat. Nos. 4,756,571, 5,102,185, and 7,093,882.

STATEMENT REGARDING FEDERALLY SPONSORED RESEARCH OR DEVELOPMENT not applicable

NAMES OF PARTIES TO A JOINT RESEARCH AGREEMENT not applicable

REFERENCE TO A SEQUENTIAL LISTING not applicable

BACKGROUND OF THE INVENTION

The invention pertains to adaptation of cab high load bed covers used with pickup trucks to provide improved access to the load bed for loading/unloading and also to extend functions to new uses (where "cab high" is used to distinguish covers of approximately cab height, or greater, from load bed covers having a low profile, which are usually described as "tonneaus"). A major focus is upon achieving these benefits in a manner best accommodating processes broadly in use relative to conventional fixed mount cab high covers of the prior art (also referred to as "caps" and including covers having a height approximately matching vehicle cab height or greater, as distinct from low profile load bed covers usually described as tonneaus). Applicable US classifications include 296/100.1, 100.6 hinged load covers, 296/165 expansible or collapsible vehicle body, 296/176 expansible/collapsible from a first to a second configuration for camping. The disclosure describes a system which can be adapted for installation as part of a complete rear lifting load bed cover (similar to a lift-roof cover), or sold as a kit to be installed at a retail level. The system avoids or minimizes need for modification of the cap and ensures that aesthetic benefits are fully maintained. The application of an appropriately configured 4-bar hinging system, in combination with means for controlling associated functional geometric requirements independent of the installation process, overcomes key objections directed at lift-roof covers of the prior art.

(b) Description of Related Art

Enninga, U.S. Pat. No. 5,104,175, discloses an openable cover that is operable about an internally mounted, stationary pivot means disposed adjacent the inside top, forward end of the cover so that the cover may be rotated between open and closed positions with respect to the load bed. Limitations of the concept appear to include cost and complexity both in manufacturing and installation. A system is shown for attaching and rotating a conventional cab high load bed cover 17 to provide rear lift. The system employs hinged attachment of the cover to a frame comprising left and right side bases 21, 22 joined by a bridge 29 to create a frame fixedly attached to the vehicle load bed 13. Lever members 27, 37 are attached to the frame by pivots 25, 35. It appears that the cover 17 is attached to lever members 27, 67 and thereby pivots about pivots 25, 35. With this arrangement, attaching locations on the cover 17 must be used other than as provided by cover side wall mounting rails normally employed for fixed mounting of a cover to a vehicle load bed. This apparently requires mountings of some form to be added to the cover forward wall. Such modifications may adversely affect the future utility and value of the cover and are avoided in the present invention.

Medlin, U.S. Pat. No. 5,595,418, discloses a short/long arm system for pivotally attaching a camper shell (cab high load bed cover) to a vehicle load bed, allowing rear lift while keeping the cap upper forward edge clear of the vehicle cab. However, upper and lower arm pivots are disclosed as substantially one above the other on the cap forward wall (or adjacent to it on the side walls). These upper pivot locations appear to require a prohibitively heavy and costly form of arm construction in order to achieve levels of lateral rigidity which would provide stable positioning of the cap relative to a load bed when open and also probably present difficulty with respect to completing satisfactory installation. As in Lake U.S. Pat. No. 7,093,882, attachments at the cap forward wall appear to require techniques which prevent it from being conveniently adaptable to a variety of production caps.

Whereas Medlin discloses a large long upper arm above a large short lower arm, each arm pivoting from an upper attachment at, or adjacent to, the cap forward wall, the present invention employs relatively small short forward and long rearward arms, each pivoting from an upper attachment at, or close to, the horizontal mounting rail at the lower edge of each side wall. In Medlin, an upper arm upper pivot resides substantially vertically above a lower arm upper pivot on or proximate the cap forward wall (cap closed), whereas in the present invention arms are positioned so that the upper pivot of each arm lies substantially on, or close to, the same horizontal plane when closed, and at no time does one arm lie above the other. Medlin discloses lengths for upper and lower arms around 48 and 30 inches, respectively, which are 6 or more times longer than needed for arms in the present invention.

Technology of the prior art also includes a 4-bar hinging system used in forward hinged attachment of low profile molded unit covers (e.g. Leer model 700) to pickup load beds. However, 4-bar hinges of the prior art for low profile load bed cover applications, if applied to forward attachment of a cab high cover, provide insufficient rearward travel of the cap to maintain clearance between a truck cab and a load bed cap when raised.

Market testing of the lift-roof cover concept defined by Lake U.S. Pat. No. 7,093,882 revealed cost issues resulting from replacement of the cap forward wall with a hinged forward wall assembly and from associated complexities of addressing multiple applications of potential customer interest. Interest has been further limited by an associated loss of availability of forward window options demanded by many users of conventional caps. The present invention provides reductions in complexity of application relative to Lake U.S. Pat. No. 7,093,882 while giving up a small degree of functionality. The improvement in loading access is provided with use of readily available caps requiring minimal or no attachment modifications. The invention is simplified relative to Lake U.S. Pat. No. 7,093,882 by avoiding need for modification of the cover forward wall, thereby more easily maintaining functional robustness and supporting customer demand for pivoting, removable, or sliding forward window options.

SUMMARY OF THE INVENTION

It is an objective of the invention to provide means for adapting a conventional cab high load bed cover to allow rear lift access as installed for use, with broad application to production pickup trucks and covers. Conventional cab high covers of the prior art vary in many details of design, as do pickup truck load beds. However, almost all load beds are built with side walls including substantially horizontal surfaces along their upper longitudinal edges which may be referred to as "bed rails". Conventional molded caps are made with surfaces along the lower edges of their walls, usually referred to as "cap rails" and matching the load bed rail surfaces for mounting thereon. In a conventional fixed mount, cab high cover (cap) installation, weather seals are normally attached between the cap rails and load bed rails. The invention provides a lift adaptation system which is also attached between the cap rails and load bed rails, thereby supporting near-universal application with little or no modification of the cap or load bed.

In one embodiment of the invention, the cap rails are used as mounting surfaces for an upper intermediate rail attached to an upper link of a 4-bar hinge assembly. The hinge assembly may also be attached at a lower link to a lower intermediate rail which is, in turn, attached to the load bed. With the addition of upper and lower intermediate rails for attachment along the length of the cap rails and load bed rails, respectively, this embodiment of the invention conveniently accommodates attachment to the rails of key components needed for control of relationships between the cap and load bed. Such components include cap lift assist means (typically gas compression struts or articulating arms carrying compression struts), side retainers (to ensure correct lateral positioning of the cap relative to the load bed when closed), pivoting fixed strut means for securely holding the cap to a fixed partly raised position when needed for transporting an over height cargo), and draw latches for conveniently drawing and securing the cap to a closed position on the load bed. With pre-assembly of such a hinge and intermediate rail system, component relationships required for optimal function may be kept independent of installer skills, ensuring reliable reproduction of desired system geometry and supporting an installation process suited to the needs of most load bed cover retailers.

Forward pivoting of cab high covers (versus low profile covers) introduces issues beyond the obvious issue of cab interference resulting from tilting of the forward wall as a cap is lifted. A cab high cover typically has greater weight than a flat cover and, to the degree that lower edges of the side walls remain structurally unsupported, flex at hinge mountings will generally be greater. Considering flex and manufacturing costs, it is desirable to keep hinge arm lengths short. In 4-bar hinge applications of the prior art for unit-molded low profile load bed covers, pivots are longitudinally spaced so that, over much of the operating range, a long rearward arm lies vertically above a short forward arm in side view and the arms are limited in rotation, so that upper pivots only rise toward perpendicular (relative to upper surface of load bed side wall) during cover opening and only fall during closing. In the present invention, longitudinal spacing of pivots is such that a short forward arm rotates "over center" and at no point during operation lies vertically below the long rearward arm.

It will be recognized by one skilled in the art to which the invention pertains that application of a load bed cover to a load bed needs to fully address the effects of dynamic vehicle operation. In particular, structural flex and associated stresses will occur. The extent and effects of such stresses were inadequately addressed in some early molded cap designs with resulting fractures in extreme use cases. Although manufacturers have, in general, greatly improved structural characteristics, caps have used fixed mountings. Most caps maintain stable dimensions but, without lateral support, some early products have shown tendencies for lower edges of the rear door opening to start spreading. It is therefore necessary that, in closed condition, cap side walls are laterally constrained at the lower edges in a manner providing equivalence to mounting of conventional fixed caps. Such constraint may be conveniently integrated into the invention as will be described. Another consideration is that some manufacturers build a front to rear taper into the load bed side walls as a styling enhancement. This affects operation of a linkage as employed in the invention, resulting in flex effects which must be accommodated in system function.

The invention will be recognized by one skilled in the art to which the invention pertains as addressing complex issues associated with adaptation of production fixed mount cab high load bed covers to rear lift access. This is accomplished with simple structures which, in combination, provide the obvious advantages of rear lift access together with numerous advantages over technology of the prior art, including:

Supporting near-universal application across production pickups and cab high caps;

Providing fuel economy improvement primarily due to reductions in frontal area and associated aerodynamic drag compared against on-highway use of caps exceeding cab height as means for providing improved load bed access;

Retaining all the appearance, protection and security benefits provided by a conventional, fixed mount, cab high load bed cover (cap).

Utilizing readily available hardware already in widespread use;

Providing the benefits of rear lift access with components which may be conveniently packaged, shipped and stored as a kit at low cost;

Supporting convenient adaptation to lift access of production caps already in service;

Incorporating means for conveniently and effectively accommodating dimensional variations across production caps and vehicles;

Avoiding need for reliance upon installer skills to ensure optimal system geometry (with use of upper and/or lower intermediate mounting rails);

Incorporating means of moving cover axis of rotation rearward during lift, minimizing (at cap full open) the adverse effects of compression strut low temperature effort fall-off.

Addressing structural deficiencies which may be present in some cap or pickup load bed designs relative to adaptation to lift access (with use of intermediate rails);

Ensuring high levels of cover lateral stability when open, by employing forward mounted compact dual pivot arms in conjunction with rear mounted articulating arms.

Facilitating use of forward compression struts in combination with rear mounted struts to a) facilitate installation and b) support improved reliability and lift effort modulation.

Supporting convenient adaptation to use with various load management accessory rail systems offered by pickup truck manufacturers.

DESCRIPTION OF THE SEVERAL VIEWS OF THE DRAWING

The description refers to the accompanying drawings in which like characters refer to like parts throughout the several views. Much of what is described in the disclosure refers to one side of an installed short/long arm 4-bar hinge system. The other side may assumed to be of like, or mirror image, form and in such cases the same reference number may apply on both sides.

FIG. 8 is a side view of a 4-bar hinge and intermediate rail assembly folded as for shipping FIG. 9 is a side view of a 4-bar hinge and intermediate rail assembly in open condition.

FIG. 10 is an enlarged fragmentary sectional view along lines 10-10 of FIG. 9 showing attachment to an upper intermediate rail of an upper to lower intermediate rail side retainer means.

FIG. 11 is a side view of an alternate 4-bar hinge and lower intermediate rail assembly used in conjunction with a generally channel section bar or rail of a type offered by pickup manufacturers for attachment of load management accessories to a load bed.

FIG. 12 is an enlarged fragmentary view along lines 12-12 of FIG. 11, showing relationships between the 4-bar hinge and integral lower intermediate rail assembly, the channel section rail and the load bed upper inboard flange.

DETAILED DESCRIPTION OF THE INVENTION

Figure 1:
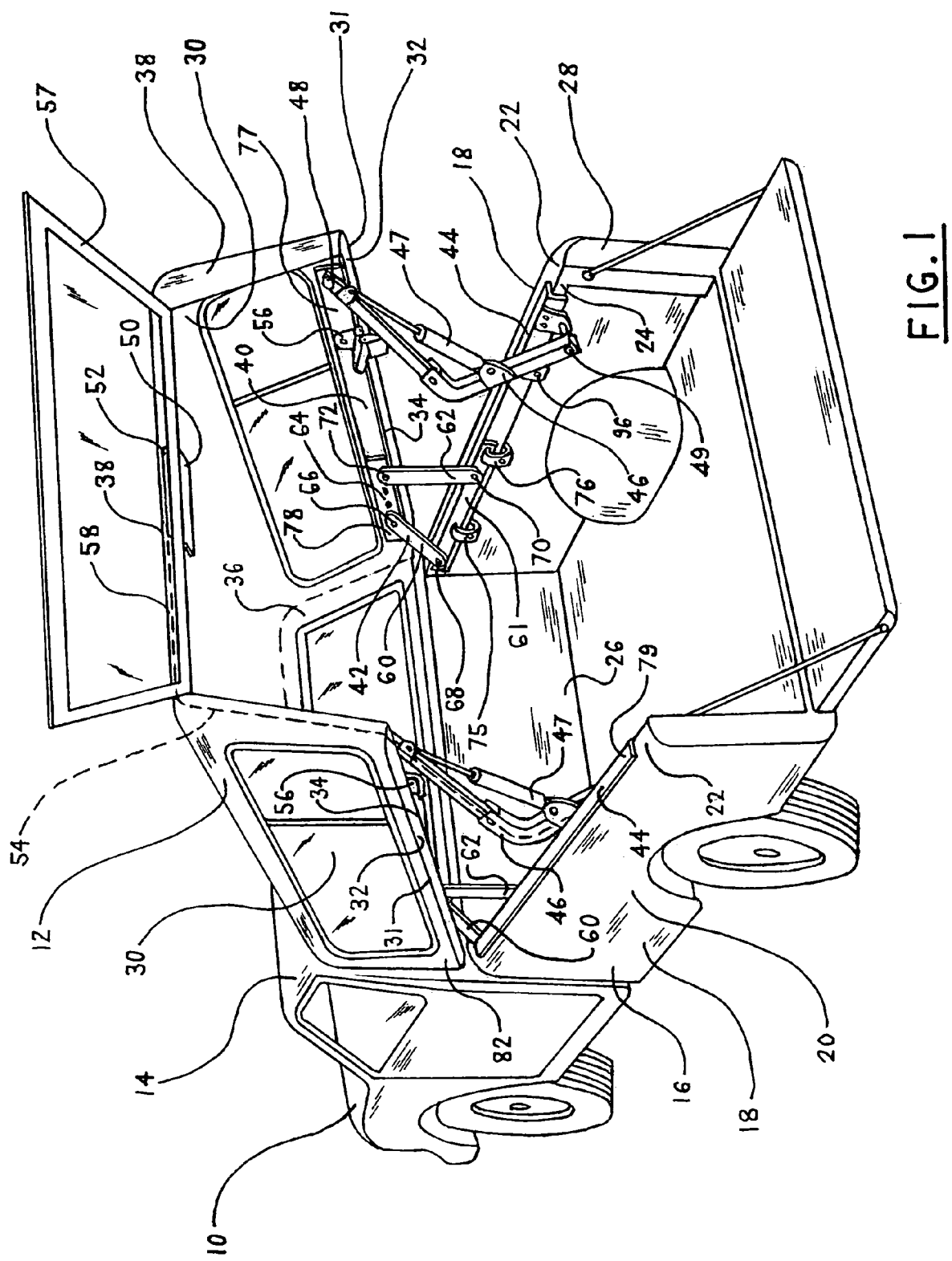
FIG. 1 is a perspective view from the rear showing a cab high cover (cap) mounted on vehicle load bed via a 4-bar hinge and intermediate rail system in raised, open position.

Referring to FIG. 1: As installed on a pickup truck 10, a cab high load bed cover (cap) 12 is mounted behind a passenger cab 14 on a load bed 16 including side walls 18 fabricated so that a side wall outside vertical surface 20 is continuous with an upper, substantially horizontal rail surface 22 of the wall 18. The rail surface 22 likewise is continuous with an inside vertical flange 24 joined to the rail surface 22 at about 90 degrees, extending downward typically one to two inches and serving to add rigidity. The inside vertical flange 24 is generally accessible along most of the length of the load bed 16 between the load bed forward wall 26 and rear end 28. Side walls 30 of the cap 12 are joined at their lower edges 31 to cap structural rails 32 which terminate along their length at an inner edge 34 above the load bed flanges 24 and extend from a forward wall 36 to the cap rear wall 38. The cap rails 32 generally match contours of the load bed rails 22. In one embodiment of the invention the cap 12 is attached at the cap rails 32 to an upper intermediate rail 40 attached to a short/long arm (SLA) 4-bar hinge assembly 42; the 4-bar hinge assembly 42 is in turn attached to a lower intermediate rail 44, and the lower intermediate rail 44 is in turn attached to the inside vertical flange 24 of the load bed side wall 18.

One embodiment of the invention employs articulating strut arms 46, carrying pivotally mounted rear compression struts 47, the strut arms 46 being pivotally attached between the upper and lower intermediate rail assemblies 40, 44 at a rearward, fixedly attached upper pivot 48 and at a rearward fixedly attached lower pivot 49 in such a manner as to provide assist when the cap 12 is raised or lowered from the rear 38. For the purpose of raising or lowering the cap 12, a handle 50 is fixedly attached to the cap 12 in a rearward location proximate a legally required central high mounted stop light (CHMSL) unit 52 connected to electrical wiring 54 routed to the vehicle 10 via an articulating strut arm 46. Latching means 56 (such as claimed and/or disclosed in Lake U.S. Pat. No. 7,093,882), attached to a cap rail 32 or an upper intermediate rail 40, allows latching of the cap 12 to a closed position relative to the load bed 16 by engagement with the load bed 16 or lower intermediate rail 44 attached thereto. A rear door 57 is typically hinged to the cap 12 in proximity to the cap roof rear lateral edge 58 and provides closure of the cap rear wall 38 between the (left and right) cap side walls 30.

Figure 2:
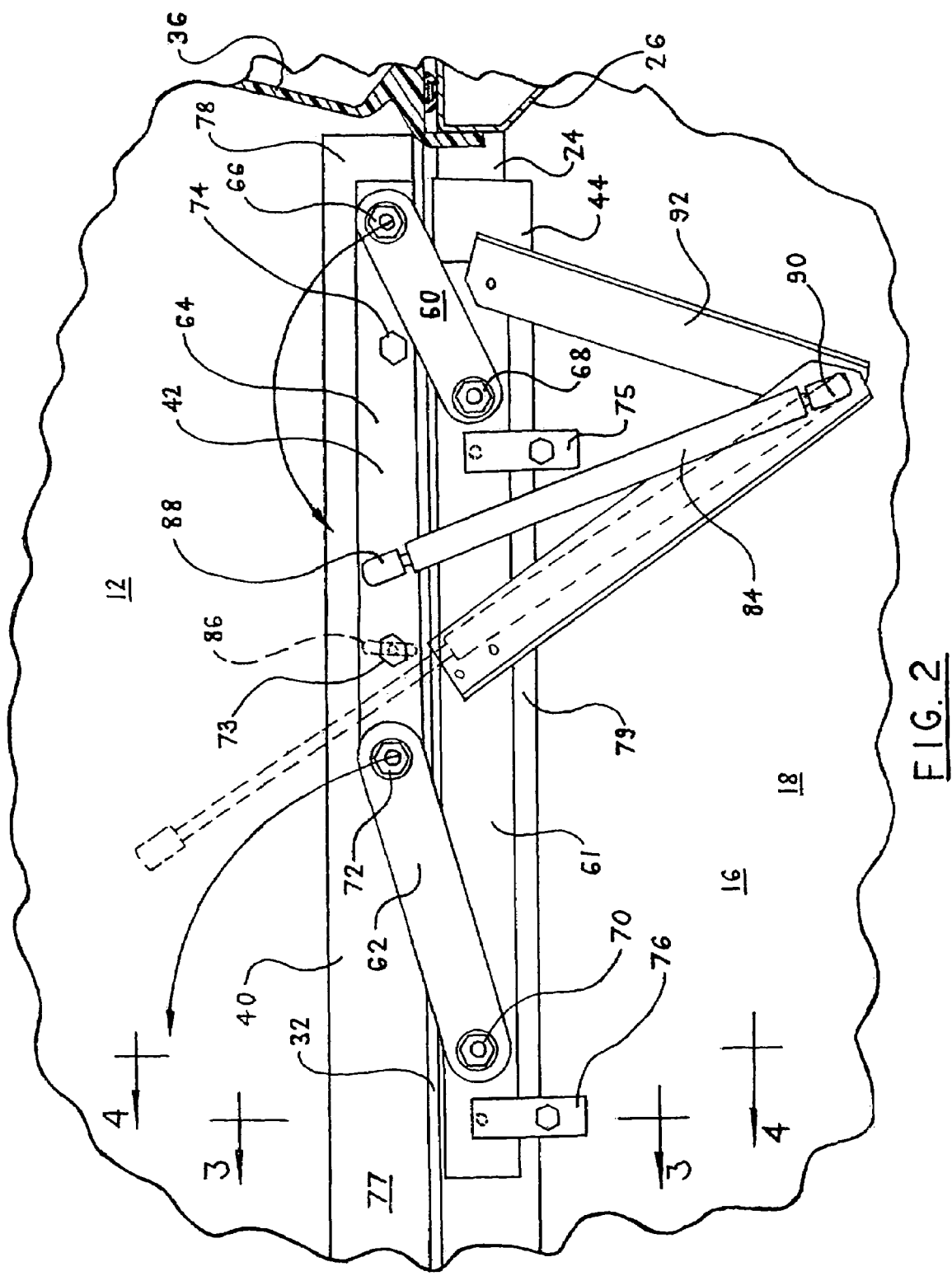
FIG. 2 is a side elevation looking left at a left side 4-bar hinge assembly with cap closed, showing forward compression strut mounting and 4-bar hinge adjustment means.

Referring to FIGS. 1 and 2: The 4-bar hinge assembly 42 may be understood as four links 60, 61, 62, 64 interconnected by pivots 66, 68, 70, 72, making up a closed linkage 42 of quadrilateral form. Two links 64, 61 on opposing upper and lower sides incorporate attachment means 73, 74 and 75, 76, respectively, by which major bodies may be attached. The other links, comprising a short arm 60 and long arm 62, control relationships between links 61, 64 and between a cap 12 and load bed 16 fixedly attached to links 61, 64, respectively. Geometric relationships (as installed for use) include location of upper pivots 66, 72 for arms 60, 62, respectively, on or in proximity to the cap mounting rail 32 forming the base of each cap side wall 30. The lower pivots 68, 70 are located in proximity to the upper edges 22 of the load bed side walls 18 (where a lower edge of the side wall inside flange 24 may be considered in proximity to the side wall upper surface 22) and are longitudinally spaced apart a distance greater than the spacing between the long arm upper and lower pivots, 72, 70, respectively, so that under all operating conditions a short forward arm 60 remains forward of the long rearward arm 62. The short/forward arm 60 rotates "over center" (beyond a condition where a line through upper pivot 66 and lower pivot 68 of the forward arm 60 reaches an angle perpendicular to an upper surface 22 of the side wall 18) so that, during later stages of opening, the short arm upper pivot 66 falls relative to the lower pivot 68. This increases rearward movement of the forward arm upper pivot 66 sufficiently to support a maximum cover lift angle equivalent to that provided by 4-bar hinge systems of the prior art for low profile load bed covers, while employing a short arm length allowing minimal levels of lateral arm flex.

An upper intermediate rail 40 comprising one or more generally angle section extrusions 77 is fixedly attached toward a forward end 78 to a hinge system upper link 64 and extends rearward most of the length of the cap rail 32 toward fixedly attached upper pivot means 48 and latch means 56. A lower intermediate rail 44 comprising one or more generally angle section extrusions 79 is fixedly attached to the hinge assembly lower link 61 and extends rearward along a load bed side wall 18 toward a fixedly attached strut arm lower pivot means 49. The upper and lower strut arm pivot means 48, 49, are engaged with the articulating strut arms 46, and constrain the strut arms 46 to a substantially vertical orientation in front or rear view when the cap 12 is raised.

SLA hinge geometry causes the cap instant rotational axis (defined by intersection of force lines through pivots 66, 68 and pivots 70, 72 of arms 60 and 62, respectively), to move from ahead of the cap forward wall 36 to a location well aft of the forward wall 36 as the cap 12 is raised. Thus, vertical rear lift force (total unaided) needed to raise the cap 12 may exceed half cap weight when lifting from closed, but decreases toward full open. This allows rear mounted lift assist compression struts 47 with relatively low force value to hold the cap 12 fully open and expands the range of geometry which allows the cap 12 to also sit closed without being separately retained in that position.

Whereas open cap forward lateral stability may depend primarily on lateral control provided by the hinge forward/short arms 60; rear mounted articulating arms 46 (as defined by Bacon, Pub. No. US2004/0084928 A1, and marketed by Bauer Products Inc. of Michigan) control cap lateral deflection of the cap rear 38 while supporting rear opening lift similar to lift achieved with some forward hinged low profile covers. To provide the desired improvement in rear loading access (as for drive-on loading of a garden tractor), rear height clearance is needed approaching double the head room of a typical cab high cover above a closed flat cover. Pivot arm geometry is defined primarily by need to offset tipping of the cap forward wall 36 toward the vehicle cab 14, when raising the cap 12. It will be recognized by one of ordinary skill in the art that rearward travel of the upper forward pivot 66 is limited by rotation of the forward/short arm 60. It will also be seen that, with the forward upper pivot 66 located aft of the cap forward lower corner 82, rearward travel may be further limited by interference of the cap forward lower corner 82 with the vehicle load bed 16, due to downward tipping ahead of the forward arm upper pivot 66. This requires the pivot 66 to be located close to a cap lower forward corner 82.

In an embodiment of the invention employing lift assist means 47 mounted rearward only, when the cap 12 is raised at the rear 38, the SLA 4-bar hinge upper link rearward attachment means 73 exerts force on the cap mounting rail 32 and, at the same time, lower link rearward attachment means 76 exerts opposing force on the load bed side wall inside flange 24 and/or lower intermediate rail 44 (where employed). Effects include deflection of the cap rail 32 and load bed rail 22 (plus possible bowing of hinge arms 60, 62). Loading of forward arms 60 is generally of concern only with respect to arm flex because such forces are transferred primarily via forward attachment means 75 and forward attachment means 74, both of which are structurally well supported due to proximity to forward walls 26, 36.

The SLA hinge arms 60, 62 (primarily forward/short arms 60) must provide reliable lateral positioning of the cap 12 with minimal bowing under load. However arms 60, 62 must flex sufficiently to accommodate lateral stacking of manufacturing and/or assembly tolerances and to a further degree in some applications where load bed side walls have tapered front to rear spacing for vehicle styling enhancement. Flex effects manifest as additional movement of the cap 12 toward the cab 14 when the cap rear 38 is raised, before hinge actuation causes forward cap lift-off from the load bed forward wall 26. Flex effects can be reduced by addition of forward compression strut means 84 (as shown in FIG. 2) to apply forward lift force at forward locations 88, 90 between the load bed 16 and cap 12, bypassing the hinge arms 60, 62, so that initial load transfer through the hinge arms 60, 62 is reduced when the cap 12 is raised from closed.

Manufacturing dimensional variation as well as flex under 4-bar hinge system operation can add significant lost motion in the form of forward tipping of the cap 12 when raised at the rear 38, before SLA hinge actuation causes lift-off of the cap forward end 36. This may be addressed in part via means for adjusting angle of upper or lower hinge link means 64, 61 relative to the cap or load bed mounting rails 32, 22. With variability in thickness of the cap mounting rails 32, adjustment of relative orientation between the SLA hinge upper link/bracket 64 and the cap side wall mounting rail 32 is needed to facilitate closed cap surface-to-surface alignment, as needed for desired seal compression. In a preferred embodiment, such adjustment may be obtained via slot vertical adjustment means 86 at a rearward attachment 73 of the hinge upper link/bracket 64.

Greatest structural deflections occur in transition from zero to maximum load through the SLA hinge arms 60, 62 when the cap 12 is initially raised from closed. However, with addition of forward compression struts 84, force through these struts remains present even when the cap 12 is fully closed, so that a force transition from zero to maximum levels is avoided. The forward compression strut 84 extends from an upper pivot 88 on the 4-bar hinge upper link 64 and/or intermediate rail 40 to a lower pivot 90, attached via lower pivot mounting means 92 to the lower intermediate rail 44 and/or lower link 61.

In applications where cap structural rigidity is low relative to weight, use of high force rear compression struts 47 alone may cause high levels of flex, possibly with associated functional issues. Therefore, the use of added forward lift struts 84 in combination with reduced force rear struts 47 is likely to prove more reliable, as well as supporting improved modulation of lift effort, while also avoiding compromise of the control benefits associated with use of articulating arms 46 at full rearward locations. Therefore, a preferred embodiment may incorporate adjustment means 86 to achieve optimal cap closure, in combination with forward compression struts 84 to minimize loading through the arms/links 60, 61, 62, 64 and pivots 66, 68, 70, 72.

Figure 3:
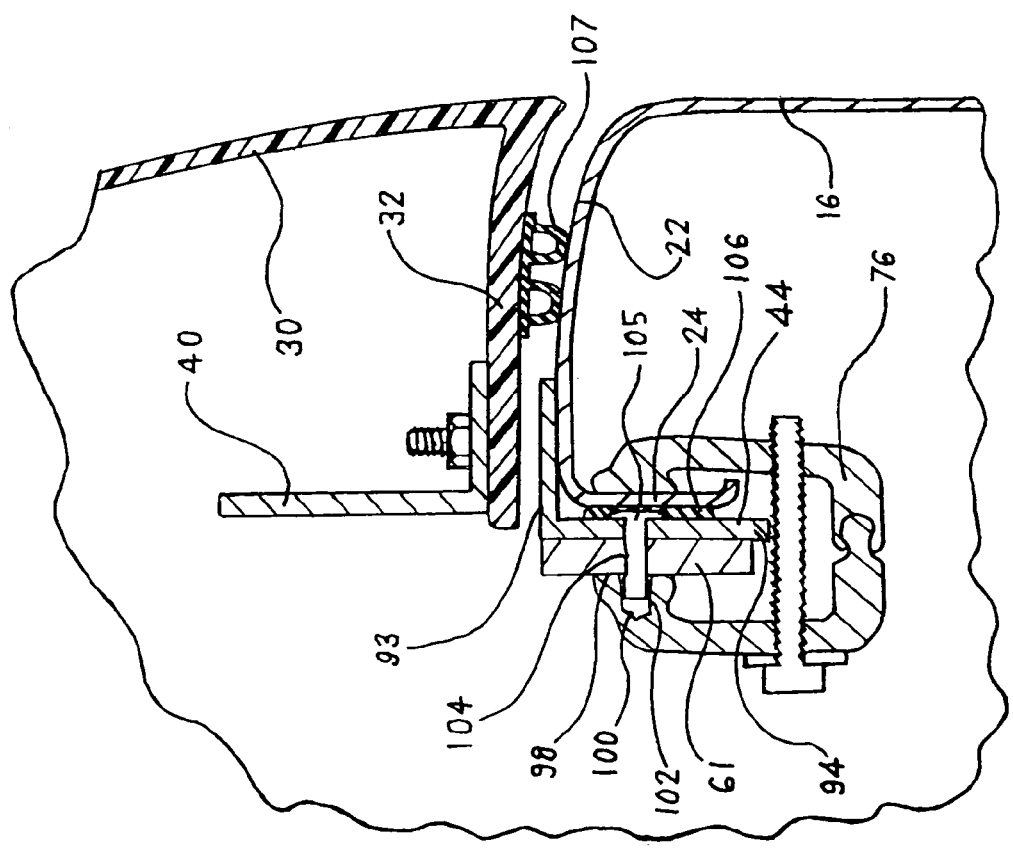
FIG. 3 is an enlarged fragmentary sectional view along lines 3-3 of FIG. 2, showing lateral location of longitudinal cap to load bed sealing means relative to intermediate rail, including detail of the locational capture of a lower intermediate rail to load bed attaching clamp by means of a rivet through the lower intermediate rail.

Referring to FIGS. 1, 2 and 3: Installation typically presents opportunities for error, but is simplified by use of lower intermediate angle section rails 44 clamped longitudinally against the vehicle load bed side wall inside flanges 24, with a horizontal flange 93 between the load bed side wall upper surface 22 and cap rail 32. Lower Intermediate rails 44 include pre-location of hinge assemblies 42 and rear strut arm lower pivot means 49 so that correct location of intermediate rails 44 relative to the load bed forward wall 26 results in automatic capture of desired hinge and lift assist system geometry. For safety, the lower intermediate rails 44 need to be securely attached to the vehicle load bed 16. A vertical flange 94 of the lower intermediate rail 44 is clamped to a load bed side wall inside vertical flange 24. Relying upon friction alone could be unreliable, given any possibility of error in applied clamp screw torque. In a typical embodiment, a minimum of three attachments on each side are used including clamps 75, 76, 96 on the lower intermediate rails 44 and load bed inside vertical flanges 24. A clamp 76 has a clamping face 98 with a hole 100 engaging the projecting end 102 of a rivet 104 passing through the lower intermediate rail vertical flange 94. With clamps 75, 76, 96 thereby positively engaged with a lower intermediate rail 44 and looped around a side wall inside flange 24, each lower intermediate rail 44 is thereby positively retained to the load bed 16. When clamp means 75, 76, 96 are tightened, flat rivet heads 105 are compressed against rubberized facing 106 adhesively attached to the lower intermediate rail 44.

Referring to FIG. 3: Load bed covers are generally molded to fit on a load bed with an integrated appearance and sufficient clearance for installation of adhesive-backed strip sealing means 107 longitudinally installed between the load bed side wall upper rail surface 22 and the cap mounting rail 32. Space between cap rail 32 and load bed side wall upper surface 22 allows outboard location of seal means 107. The angle section lower intermediate rail horizontal flange 93, being no more than compressed thickness of a cap to load bed strip seal 107, may be mounted toward the inside flange 24 of the load bed side wall upper surface 22 without degrading seal function or vehicle appearance.

Figure 4:
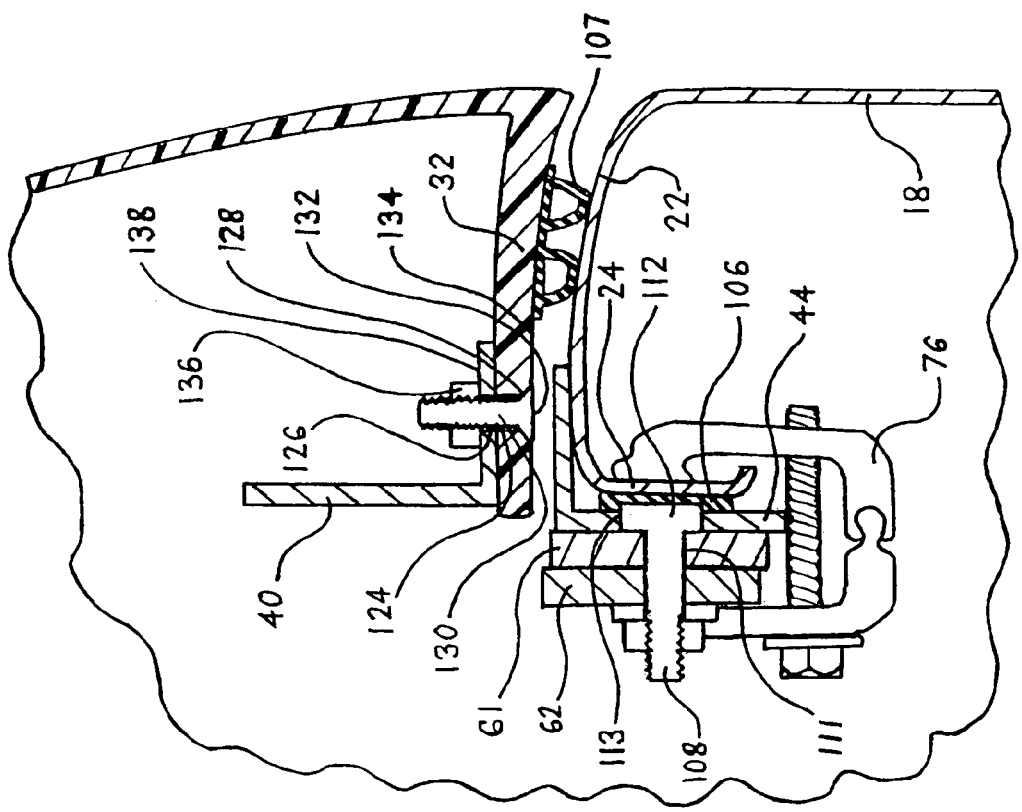
FIG. 4 is an enlarged fragmentary sectional view along lines 4-4 of FIG. 2 showing 4-bar hinge pivot means retention relative to a lower intermediate rail and a load bed mounting rail.

Referring to FIGS. 2 and 4: Hinge pivot means 66, 68, 70, 72 include bolts 108 with shanks 110 passing through close fitting holes 111 in the hinge links 61, 64 and arms 60, 62. Hexagonal heads 112 of the bolts 108 passing through the lower links 61 are retained in matching hexagonal holes 113 in the lower intermediate rail 44 and protrude outward against the adhesively attached rubberized facing 106.

Figure 5:
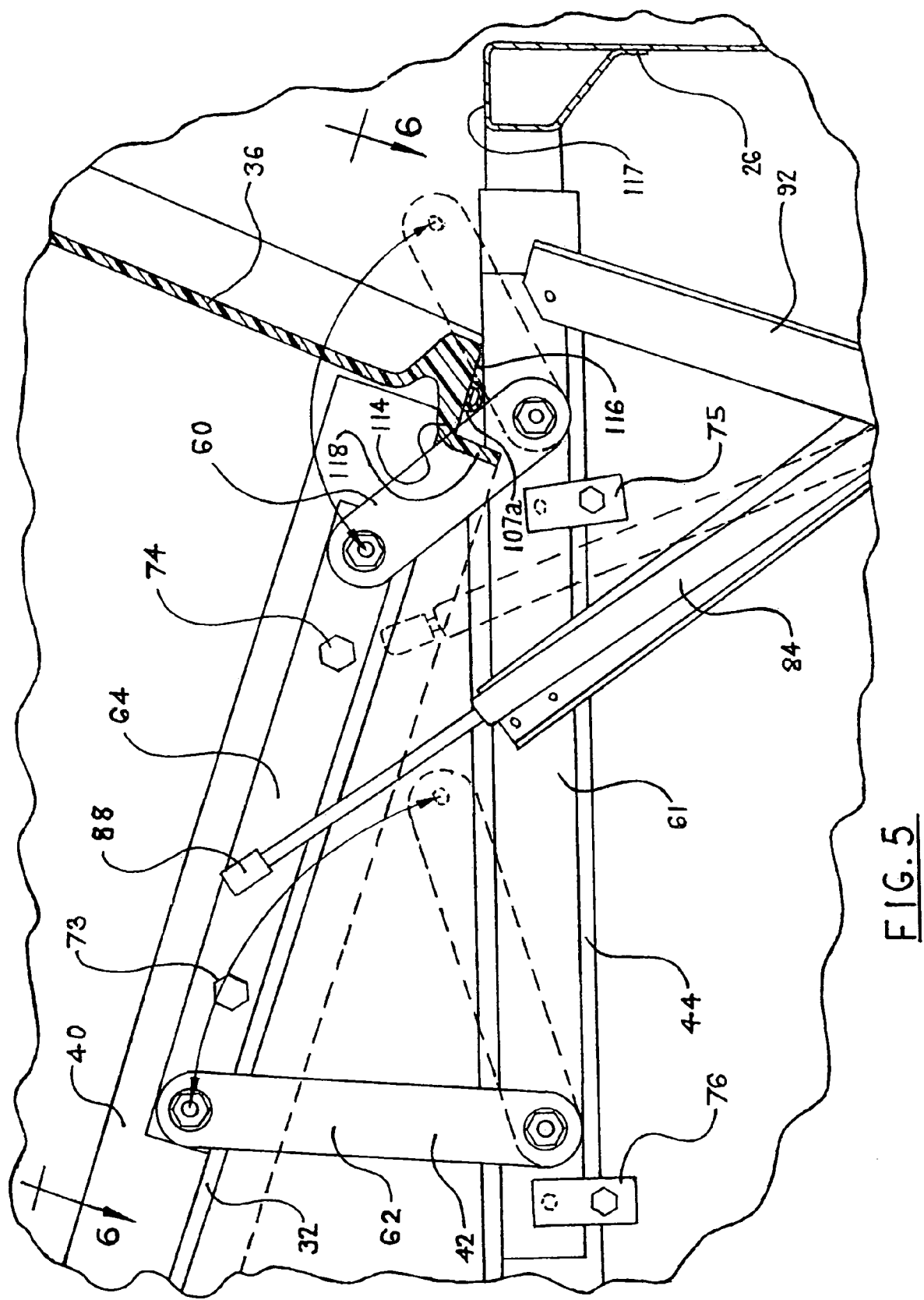
FIG. 5 is a side elevation looking left at a left side installed 4-bar hinge assembly with cap open, showing relation of hinge system to cap forward wall.
Figure 6:
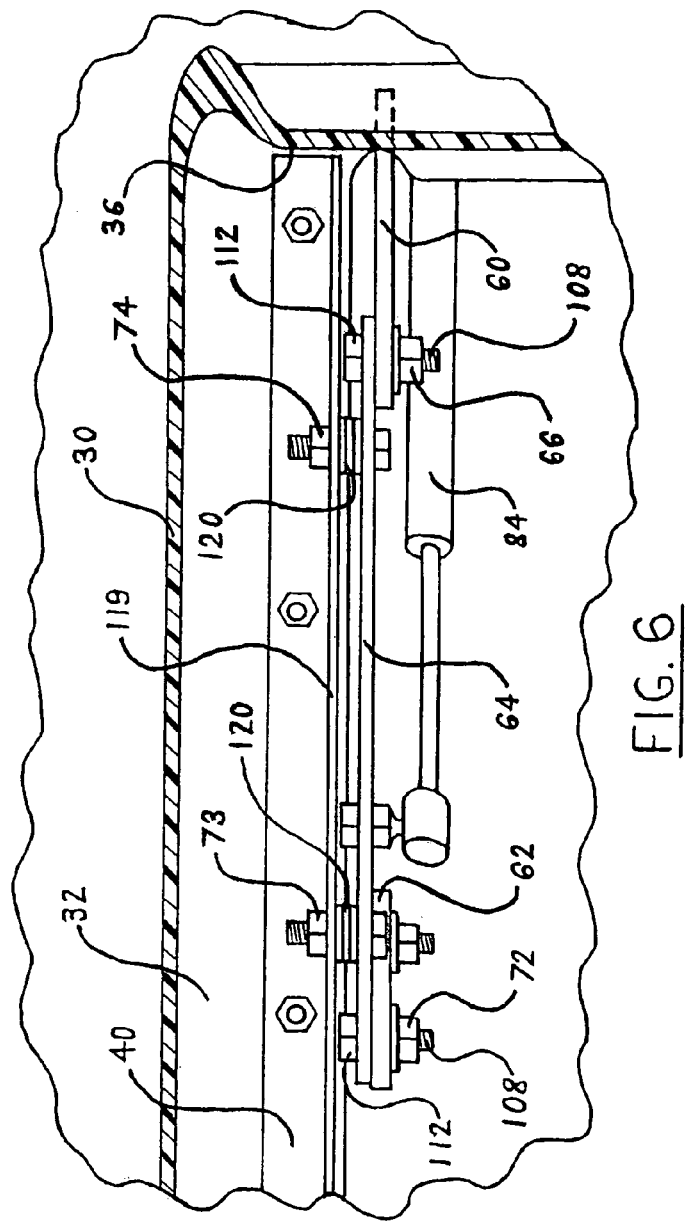
FIG. 6 is a fragmentary sectional view along lines 6-6 of FIG. 5 showing use of spacing means at attachment of a 4-bar hinge assembly (upper link) to upper intermediate rail plus relief/clearance requirements between a molded cap locating lip and hinge arms in an open condition.

Referring to FIGS. 1, 5 and 6: The lower edge 114 of a cap forward wall 36 forms a lateral shelf 116, typically extending forward about two inches, to which strip seal means 107 is adhesively attached. seal means 107*a* seals against the top surface 117 of the load bed forward wall 26 when the cap 12 is closed. Where a cap manufacturer incorporates a molded lip 118 extending downward from the cap mounting rails 32 and forward wall 36 (inside the load bed side and forward walls 18, 26 when installed), the lip 118 will probably need to be locally relieved to provide clearance adjacent to the hinge assemblies 42, latches 56 and/or strut arms 46. Such material removal can generally be accomplished without compromising sealing or cap integrity.

Referring to FIG. 6: To facilitate adjustments at attachment means 73, 74 clearance must be provided for bolt heads 112 at upper pivot means 66, 72 relative to the vertical flange 119 of the upper intermediate rail 40. When a single extrusion upper intermediate rail 40 is used, the required clearance may be achieved using spacing means 120 between the upper link 64 and upper intermediate arm vertical flange 119 at attaching means 73, 74.

Figure 7:
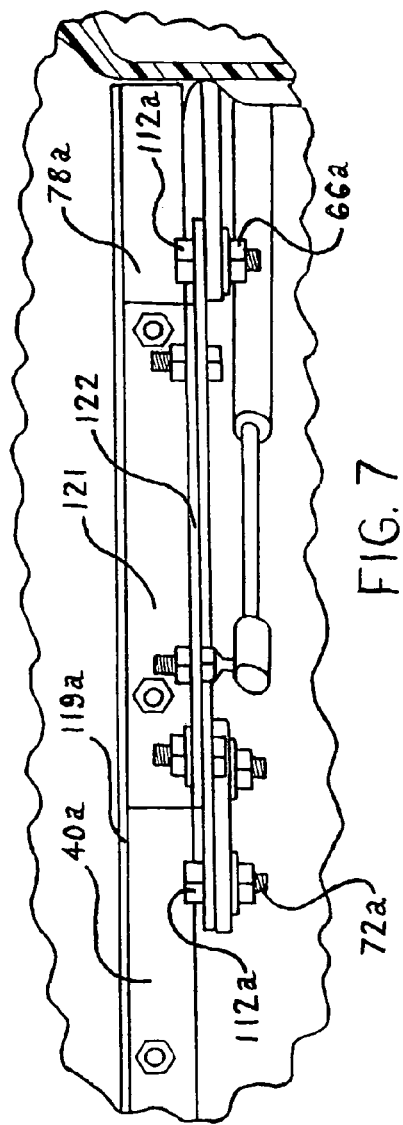
FIG. 7 is an enlarged fragmentary view similar to FIG. 6 of an alternate structure for adjustable attachment of a 4-bar hinge to an upper intermediate rail.

FIG. 7 illustrates an alternate method for providing bolt head clearance at upper pivot means 66, 72, whereby bolt head clearance results from using an angle section intermediate rail 40*a* with a vertical flange 119*a* located outboard. A short upper link attaching bracket 121 of similar angle section is mounted toward the forward end 78*a* with an inboard vertical flange 122 between, and clear of, the hinge upper pivot heads 112*a*.

Referring to FIGS. 1, 8 and 9: The use of an upper intermediate rail 40 mounted to the cap side wall mounting rail 32 (at each side), to which 4-bar hinge linkage upper link/bracket 64, latching means 56 and a rear lift assist means upper pivot 48 are fixedly attached, provides further capture of geometric relationships similar to that provided by use of a lower intermediate rail 44. Attachment of the upper intermediate rail 40 to the lower intermediate rail 44 on each side via the 4-bar hinge linkage 42 further defines relationships between components needing controlled geometric relationships for optimal function. Pre-assembly of these components provides a cap hinging system which may be installed between any cap and load bed of suited dimensions using an installation process which may be completed with minimal training requirements.

Upper and lower intermediate rails 40, 44 may be shipped pre-attached to 4-bar hinge linkages 42 at the upper and lower links 64, 61, respectively, with compression struts 47, 84 left unmounted to facilitate shipping/storage with the rails 40, 44 folded.

Referring to FIGS. 1, 4, 5 and 8: System installation requires mounting of the upper intermediate rails 40 on the cap rails 32 with lateral spacing matched to that of the load bed side wall rails 22 on which the cap 12 will be mounted. This process is simplified where it can be first confirmed that spacing of cap rail inside edges 34 will correctly align with spacing of the load bed inside vertical flanges 24. Longitudinal positioning is dependent upon clearance requirements for the cap forward wall lower edge 114 relative to the short arm 60 and lower intermediate rail 44 (or load bed side rail 22) with the cap 12 fully open, but may be set by positioning of the upper intermediate rail forward end 78 relative to the cap forward wall 36. With the cap 12 suitably supported, the upper intermediate rails 40 are clamped in the desired position on the cap rails 32. Holes 124 may be drilled in the cap rails 32 using holes 126 pre-drilled in the upper intermediate rails 40 for guidance. The lower openings 128 of holes 124 through the cap rails 32 are opened up with a countersink tool and flat head countersunk machine screws 130 are entered into the holes 124 with flat heads 132 flush with the cap rail lower face 134. Capture of the upper intermediate rail 40 is completed with installation of locknuts 136 at the upper intermediate rail horizontal flange upper surface 138. (In cases where the cap rails 32 are fabricated from flat plate/sheet metal, pan head or suchlike fasteners may be used in place of countersunk flat head screws 130 and nuts 136, where the head height of such fasteners remains low relative to compressed height of sealing means 107).

The upper intermediate rail 40 may be attached to a cap rail 32, as described above, in assembly with the SLA hinge linkage 42 and lower intermediate rail 44. The lower intermediate rail 44 is next raised toward, and engaged with, latching means 56, which are, thereby, used to hold the intermediate rail 44 against the cap rail 32. Cap to load bed sealing means 107 are installed outboard of intermediate rail 44 along the cap rails 32 and cap forward wall lower face 116. The cap 12 may then be lowered and positioned on the load bed 16. After ensuring full seal contact along the load bed rails 22 and at the load bed forward wall 26, the hinge upper link to upper intermediate rail attaching fasteners 73, 74 are tightened to hold the adjusted alignment.

Referring to FIGS. 1, 2, 8 and 9: After positioning the cap 12 on the load bed 16, the lower intermediate rails 44 are clamped to each load bed side wall upper inboard flange 24 via clamps 75, 76, 96. The forward compression struts 84 (if part of the application) are compressed by hand and installed with the cap 12 lowered in order to facilitate an initial cap lift prior to installation of higher force rear compression struts 47 in the open condition. Latching means 56 are disengaged from the lower intermediate rails 44 and the cap 12 is raised and supported fully open. Rear lift struts 47 are installed and the cap 12 is again lowered. Latching means 56 are adjusted to engage securely with the lower intermediate rails 44. Installation is completed with attachment of a central rear lift handle 50 and connection of CHMSL/interior light wiring 54 routed through an articulating tubular strut arm 46.

Referring to FIGS. 1, 6, 9 and 10: Use of intermediate rail assemblies 40, 44 facilitates various refinements. These refinements include the incorporation of side retainer means 142 attached to an upper intermediate rail 40 and designed to engage an inboard surface 144 of the lower intermediate rail 44 so that, in closed condition, the cap side wall lower edges 31 receive positive lateral restraint, as provided by conventional fixed cap mounting methods. A side retainer means 142 is shaped to include a ramped lower end 150 which engages an inboard edge 144 of the lower intermediate rail 44 so that the cap 12 is guided to a fully aligned position on the load bed 16 when the cap 12 is closed. Where spacing means 120 are used to provide clearance for bolt heads 112 at attachments 73, 74 of the upper intermediate rail 40 to hinge linkage assembly 42, the upper intermediate rail 40 will have lateral offset relative to the lower intermediate rail 44. Therefore, for optimal alignment of the upper and lower intermediate rails 40, 44, equivalent spacing means 151 are then employed between the side retainer means 142 and an upper intermediate rail inboard face 140.

Referring to FIGS. 1, 8 and 10: Another refinement is the use of a rigid strut 152 pivotally attached to a lower intermediate rail 44 toward the rail rearward end 154 so that, in emergency need for increased load clearance, the rigid strut 152 may be rotated upward to engage fastening means 156 on the opposing upper intermediate rail 40. With appropriate retention at fastening means 156, a cap 12 may thereby be securely supported at a slightly raised position. It will be understood by one skilled in the art that rigid 152, also fastening means 156, side retainer means 142, latching means 56, SLA 4-bar hinge assembly 42, compression struts 47 and articulating arms 46 comprise cover to load bed relationship control components and may adequately provide their respective functions while being attached to upper and/or lower intermediate rails 40, 44, respectively, instead of being attached directly to the cover 12 and/or load bed 16.

Referring to FIGS. 11 and 12: Some truck manufacturers offer longitudinal, generally channel section rails 158 fixedly attached to the load bed side walls 18 immediately below the inside vertical flange 24. These rails 158 are designed to provide secure attachment of cargo management accessories and comprise systems which are marketed with various descriptions such as "deck rail system", "bed rail tracks", "bed upper rails", "slide-on bed rails","T channel load bars", "utili-track channel system". The presence of such rails 158 allows their use in attaching 4-bar hinge and intermediate rail assemblies 160, thereby eliminating need for clamping means 75, 76, 96 of a type illustrated in FIGS. 1 and 9. Attachment of 4-bar hinge and lower intermediate rail assemblies 160 is facilitated by the incorporation of lower extensions 162 fixedly attached or integral to a lower intermediate rail 164 and designed for engagement with attaching means 166 of a type similar to those used for attaching load management accessories with which the generally channel section rails 158 were designed to be used.

It will be recognized by one skilled in the art that, although the presence of generally channel section cargo management system rails 158 facilitates use of an integrated lower intermediate rail and 4-bar hinge lower link 164, the presence of such generally channel section rails (or bars) 158 also reduces need for a separate load carrying full length lower intermediate rail 164 because much of the cap system loading will be transferred more directly to load bed side wall structure 168 through the cargo management system rails 158. Therefore, where other means can be satisfactorily employed to replace or perform the locating function of a lower intermediate rail 164, rearward lift assist pivot means 49 and a (short) 4-bar hinge lower link 61 (shown in FIG. 2) may be directly attached to the load management system rail 158, obviating need for a separate intermediate rail 164.

There have been described and illustrated what are considered alternate embodiments of the invention. However, these specifications shall not be construed as limitations upon the scope of the invention, since it will be understood that many alternate variations may be made by one who is skilled in the art without departing from the scope of the invention as defined by the appended claims.

The invention claimed is:

1. For use with a load bed cover approximately cab high, raisable at the rear from a closed position to an open position on a load bed of a vehicle having a passenger cab immediately forward of the load bed:

A 4-bar hinge comprising a short forward arm and a long rearward arm, each pivotally attached toward an upper end to an upper link means and pivotally attached toward a lower end to a lower link means to create a closed linkage of quadrilateral form;

wherein the upper link means is fixedly attachable to a cab high load bed cover mounting rail, and the lower link means is fixedly attachable to a load bed side wall so that the short forward and long rearward arms will be pivotally attached to the upper link means in proximity to the cap mounting rails and will be pivotally attached to the lower link means in proximity to upper edges of the load bed side walls;

wherein longitudinal spacing of the rearward arm lower pivot axis from the forward arm lower pivot axis exceeds spacing of the rearward arm lower pivot axis from the rearward arm upper pivot axis;

and wherein, as the cover is raised to a fully open position, the short forward arm upper pivot rotates over the short forward arm lower pivot beyond a plane through the forward arm lower pivot axis and perpendicular to a load bed side wall upper surfaces in side view.

2. The 4-bar hinge set forth in claim 1, wherein an upper intermediate rail fixedly attached to (or integral with) the upper link extends substantially the length of the cover rearward of the 4-bar hinge upper rearward pivot;

the upper intermediate rail being fixedly attachable to a cab high load bed cover mounting rail and accommodating attachment of cap to load bed relationship control components independently of attachment of the rail to the cover.

3. The 4-bar hinge set forth in claim 1, wherein a lower intermediate rail fixedly attached to (or integral with) the lower link extends substantially the length of the load bed rearward of the 4-bar hinge lower rearward pivot;

the lower intermediate rail being fixedly attachable to a load bed side wall and accommodating attachment of cap to load bed relationship control components independently of attachment of the rail to the load bed.

4. The 4-bar hinge set forth in claim 1, wherein an upper intermediate rail fixedly attached to (or integral with) the upper link extends substantially the length of the cover rearward of the 4-bar hinge upper rearward pivot;

the upper intermediate rail being fixedly attachable to a cab high load bed cover and accommodating attachment of cap to load bed relationship control components independently of attachment of the upper rail to the cover and wherein a lower intermediate rail fixedly attached to (or integral with) the lower link extends rearward of the 4-bar hinge lower rearward pivot substantially the length of the load bed;

the lower intermediate rail being fixedly attachable to a load bed side wall and accommodating attachment of cap to load bed relationship control components independently of attachment of the lower rail to the load bed.

5. An approximately cab high load bed cover for a pickup truck, liftable at the rear from a closed position to an open position on the load bed, including at left and right sides a 4-bar hinge assembly as set forth in claim 1.

6. An approximately cab high load bed cover for a pickup truck, liftable at the rear from a closed position to an open position on the load bed, including at left and right sides a 4-bar hinge assembly as set forth in claim 2.

7. An approximately cab high load bed cover for a pickup truck, liftable at the rear from a closed position to an open position on the load bed, including at left and right sides a 4-bar hinge assembly as set forth in claim 3.

8. An approximately cab high load bed cover for a pickup truck, liftable at the rear from a closed position to an open position on the load bed, including at left and right sides a 4-bar hinge assembly as set forth in claim 4.

9. The cover set forth in claim 5, wherein lift assist means are pivotally attached in forward locations and provide cap lift assist in combination with rear mounted lift assist means.

10. The cover set forth in claim 6, wherein lift assist means are pivotally attached in forward locations and provide cap lift assist in combination with rear mounted lift assist means.

11. The cover set forth in claim 7, wherein lift assist means are pivotally attached in forward locations and provide cap lift assist in combination with rear mounted lift assist means.

12. The cover set forth in claim 8, wherein lift assist means are pivotally attached in forward locations and provide cap lift assist in combination with rear mounted lift assist means.

* * * * *